March 29, 1927.
L. J. TELLER
OPHTHALMIC MOUNTING
Filed Dec. 19, 1924
1,622,615
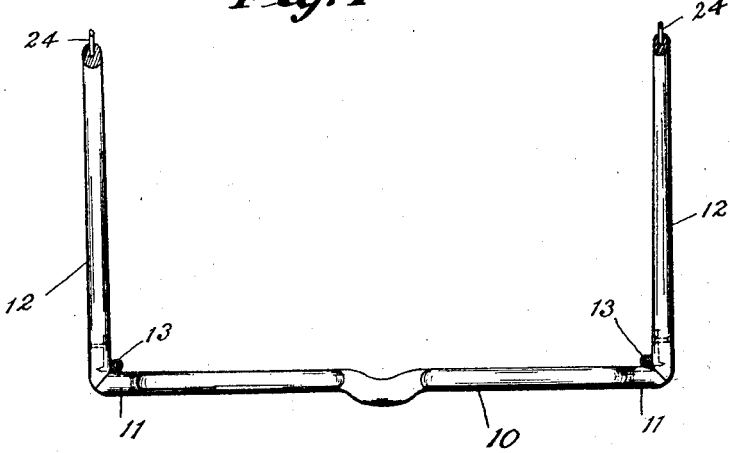
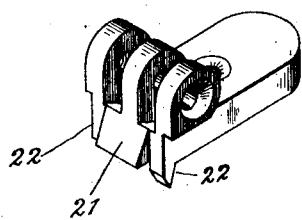
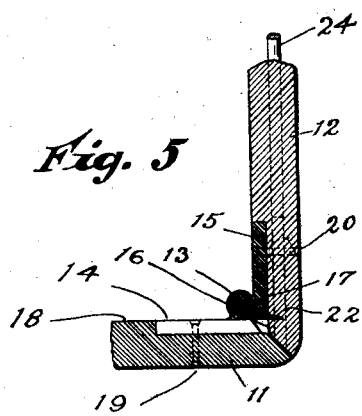
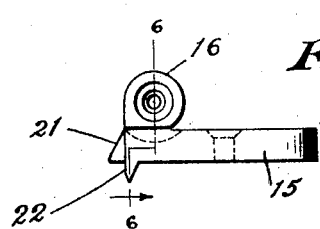
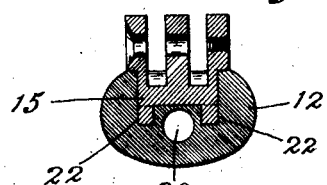
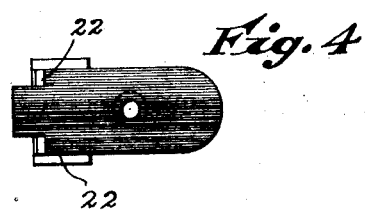
INVENTOR.
Louis J. Teller.
BY Barlow & Barlow
ATTORNEYS.

Patented Mar. 29, 1927.

1,622,615

UNITED STATES PATENT OFFICE.

LOUIS J. TELLER, OF PROVIDENCE, RHODE ISLAND.

OPHTHALMIC MOUNTING.

Application filed December 19, 1924. Serial No. 756,907.

This invention relates to an improved construction of temple hinge for an ophthalmic mounting; and the object of this invention is to provide an improved construction of hinge of this character comprising a pair of pivotally-connected plates adapted to hinge the temples to the end pieces of the frame and to provide on one or both of the plates of each hinge one or more spurs which extend rearwardly into the body of the non-metallic member to which it is attached to assist in retaining or holding the hinge plate in its set position thereon by using but a single rivet in each plate that extends through to the outside surface of the mounting.

A further object of this invention is to provide spaced spurs to engage the end portion of the temple at either side of the opening for the longitudinal core, to strengthen the end of the temple against splitting.

With these and other objects in view, the invention consists of certain novel features of construction, as will be more fully described, and particularly pointed out in the appended claims.

In the accompanying drawings;

Figure 1 is a top edge view of an ophthalmic mounting showing the temples as hinged to the end piece of the frame, the free ends of the temple being broken away showing a wire core extending from the end thereof.

Figure 2 is an enlarged perspective view of one of the hinge members having rearwardly-turned spurs.

Figure 3 is a side elevation of the hinge-plate member showing spurs at the hinge end thereof as projecting rearwardly from the plane of the rear face of the plate.

Figure 4 is a view of the under side of the hinge plate showing the spurs.

Figure 5 is an enlarged view illustrating the hinge plates as pivotally connecting the temple to the end-piece of the frame and showing a spur on one of the hinge members as projecting into the non-metallic material of the temple.

Figure 6 is an enlarged sectional end view of the temple illustrating the spurs as spaced apart to straddle the wire core receiving opening therein.

It is found in the practical construction and operation of ophthalmic mountings which are made of shell, celluloid, zylonite and the like, necessary to connect the temple member to the end-piece of the frame portion by a hinge, and it is found of advantage to form the hinge members of plates having interlocking, raised ear portions pivotally connected and to imbed the plate portions of each hinge-member in its respective member of the mounting, flush with its outer surface, and also to secure the hinge plate in its respective member by means of a single rivet, screw or other fastening, and it is further found that when so constructed that the single rivet is insufficient to hold the hinge plate against unusual strains, and therefore, to strengthen the fastening of this hinge-plate to the temple, I have provided one or more spurs on the hinge-plate, which project rearwardly and are imbedded into the non-metallic material of the temple to cooperate with the single rivet and so prevent the hinge-plate from movement in its seat about its single rivet or fastening and at the same time provide a secure and concealed fastening which shows but a single, unsightly rivet on the outside of the temple; and it is further found in practice that the temple is weakened by the removal of the central portion for the reception of the core and that often the temple splits from its front end towards the rear, and to strengthen the temple against such splitting, I have provided spurs on the ends of the temple plate, on either side of its longitudinal opening to engage the end of the temple and prevent it from splitting along the core opening; and the following is a detailed description of one construction of such a hinge-plate by which these advantageous results may be accomplished:—

With reference to the drawings, 10 designates the lens frame of the usual non-metallic ophthalmic mounting, which is provided with laterally-extending end pieces 11 from its outer edges, each of which is pivotally connected to the temple members 12 by means of hinge 13.

This hinge is preferably formed of two plates 14 and 15, each having interlocking ears 16 pivotally connected together by a pin 17 and these hinge-plates are adapted to be imbedded into the stock, the hinge-plate 14 being imbedded into the stock of the end-piece 11 so that its outer face is flush with that of the inner face 18 of the end-piece and this plate is shown as being secured in position in its end-piece by means of a single rivet 19, but a screw or other fastening may be employed, if desired, the idea being to show as few unsightly metallic fastenings on the outside as possible.

The hinge-plate 15 is therefore, similarly constructed to be imbedded into the inner face of the temple 12 and a single rivet 20 is preferably employed for fastening this plate to its temple.

These hinge-plates 14 and 15 are each provided with a beveled stop lip 21 extending forwardly from the edge of the ears 16 so as to limit the opening motion of the hinge-plates beyond a definite or predetermined angle as the projecting stop of one plate will bring up against that of the other plate and so limit the opening motion of the two.

It is found in practice that the long leverage of the temple 12 when engaged by its free end, that great strength in the hinge is required to prevent the imbedded hinge plate 15 from twisting about its single rivet fastening 20 and much trouble has been experienced from the loosening of this connection between the hinge-plate and the temple.

Therefore, in order to strengthen this fastening and prevent a relative rotating movement of the temple about the rivet 20, I have turned downwardly the outer or opposite edges of the stop 21 thus forming a pair of widely spaced apart spurs 22 on the front end of the plate and these spurs are adapted to project into the non-metallic stock of the temple forming a three-point bearing which effectually prevents any motion whatever of the temple on its hinge-plate 15 at this point.

Another reason for spacing apart these spurs 22 is to cause them to straddle the hole 23 which extends through the temple for the purpose of receiving the wire core 24 thereof, and thus strengthen the end of the temple against splitting through the opening for the rivet 20.

My improved hinge structure is very simple, practical and inexpensive to manufacture, the spurs being made from a portion of the stop lip are of such a length as not to project through to the outer surface of the non-metallic material, and, therefore, are not visible from the outside thereof and these spurs are very effective in stiffening and supporting the connection of the hinge to the temple member.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a plate riveted in position on the temple by a single rivet, hinge joint eyes on the outer side thereof at the front edge, and a spur projecting inwardly from said plate at the front edge thereof and imbedded into the temple to assist the rivet in securing the plate in set position therein.

2. A temple hinge for an ophthalmic mounting, comprising pivotally-connected plates adapted to hinge a non-metallic temple member to its end-piece member, a single rivet for binding each plate in position, and a fastening spur on one of said plates at the hinge edge thereof adapted to be imbedded into the member on which it is mounted to assist in holding it in set position.

3. In an ophthalmic mounting, an end-piece, a temple having a longitudinal opening therethrough, pivotally-connected plates attached to said temple and end-piece to hinge the two together, a pair of spaced-apart fastening spurs on the temple plate imbedded into said temple located to straddle said longitudinal opening therein to assist in preventing a relative movement of said temple and plate.

4. A temple hinge for an ophthalmic mounting comprising a pair of pivotally connected plates to hinge the temple member to the end-piece of the frame, a stop lip at the joint end of said plates, and spaced-apart portions of the lip on one of said plates being turned back to form imbedding fastening spurs.

5. A temple hinge for an ophthalmic mounting comprising a pair of pivotally connected plates to hinge the temple member to the end-piece of the frame, a single rivet for binding each plate in position, a stop lip at the joint end of said plates, and spaced-apart portions of the lip on one of said plates being turned back to form imbedding fastening spurs to assist said rivet to prevent relative movement of the hinge plate and the part to which it is fastened.

In testimony whereof I affix my signature.

LOUIS J. TELLER.